United States Patent [19]
von Wedel et al.

[11] Patent Number: 5,356,604
[45] Date of Patent: Oct. 18, 1994

[54] PROCESS FOR REMOVING HALOGENATED ORGANIC COMPOUNDS FROM WASTE GASES

[75] Inventors: Wedigo von Wedel, Friedrichsdorf; Edgar Bilger, Hasselroth; Ernst-Robert Barenschee, Hanau; John Tarabocchia, Friedrichsdorf, all of Fed. Rep. of Germany

[73] Assignee: Degussa Aktiengesellschaft, Frankfurt, Fed. Rep. of Germany

[21] Appl. No.: 976,341

[22] Filed: Nov. 17, 1992

[30] Foreign Application Priority Data
Nov. 27, 1991 [DE] Fed. Rep. of Germany ....... 4138876
Mar. 27, 1992 [DE] Fed. Rep. of Germany ....... 4210055

[51] Int. Cl.$^5$ ................................................ B01J 8/00
[52] U.S. Cl. ................................. 423/245.2; 423/235
[58] Field of Search ......................... 423/245.1, 245.2; 588/207

[56] References Cited

U.S. PATENT DOCUMENTS

| | | | |
|---|---|---|---|
| 3,929,636 | 12/1975 | Zumbrunn et al. | 210/759 |
| 3,933,980 | 1/1976 | Smalheiser | 423/245.2 |
| 3,969,479 | 7/1976 | Lonnes et al. | 423/245.2 |

FOREIGN PATENT DOCUMENTS

| | | | |
|---|---|---|---|
| 0487834 | 8/1991 | European Pat. Off. | |
| 1234912 | 2/1967 | Fed. Rep. of Germany | 423/522 |
| 2926176 | 1/1981 | Fed. Rep. of Germany | |
| 3933480 | 4/1991 | Fed. Rep. of Germany | |
| 2213238 | 8/1974 | France | |
| 1080838 | 3/1984 | U.S.S.R. | 423/245.2 |

*Primary Examiner*—Michael Lewis
*Assistant Examiner*—Thomas G. Dunn, Jr.

[57] ABSTRACT

A process for removing halogenated organic compounds from waste gases optionally containing $NO_x$, in which the waste gas is optionally supplemented with $SO_2$, optionally led through a fixed bed or fluidized bed of a solid and contacted with Caro's acid or one of its salts. The Caro's acid can be produced in situ by adding $H_2O_2$ and optionally $H_2SO_4$.

9 Claims, No Drawings

PROCESS FOR REMOVING HALOGENATED ORGANIC COMPOUNDS FROM WASTE GASES

The present invention relates to a process for removing halogenated organic compounds from waste gases which, optionally, contain $NO_x$, especially waste gases from refuse incineration plants.

BACKGROUND OF THE INVENTION

Waste gases from refuse incineration plants contain, apart from $NO_x$ (200 ppm on average) and residual $SO_2$ (10–20 $mg/Nm^3$ on average, =ca. 3 to 7 ppm), chlorinated dibenzodioxins and chlorinated dibenzofurans in a concentration of the order of ca. 2 to 10 ng $TE/m^3$ (toxicity equivalents).

In the 17th Statutory Regulation to the Federal Law on Protection from Noxious Substances, the legislature stipulates from 1996 a limit value of 0.1 ng $TE/Nm^3$.

In public discussion, thermal treatment of waste (refuse incineration) is regarded as an emission source from which a disproportionately high environmental pollution originates, especially because of dioxin emissions.

The waste gases from refuse incineration are led through adsorption plants in which the environmentally harmful substances are removed from the waste gas.

It is known to use activated coal coke or activated carbon as an adsorbent in adsorption plants. When this is done, the waste gas is led through a bed of solid with a velocity of between 0.1 and 0.3 meters/second (VDI Textbook 780, page 12). Another possibility which, unfortunately, is limited to relatively low flow rates, consists of using an activated carbon filter according to the cross-flow principle (VDI Textbook 972, page 2).

There is a disadvantage associated with the use of activated carbon. The disadvantage is that, if oxygen is present in the waste gas, the activated carbon can ignite at elevated temperature, and the adsorption performance is reduced. In the extreme case, this can also lead to the complete combustion of the activated carbon filter.

SUMMARY OF THE INVENTION

The object of the present invention is to provide a process for removing halogenated organic compounds from waste gases which optionally containing $NO_x$, especially waste gases from refuse incineration plants, which does not have these disadvantages.

The invention provides a process for removing halogenated organic compounds from waste gases optionally containing $NO_x$, in which the waste gas is optionally led through a fixed bed or fluidized bed and contacted with Caro's acid or one of its salts.

In an embodiment of the invention the waste gas can optionally be supplemented with $SO_2$, optionally led through a fixed bed or fluidized bed of a solid, and contacted with $H_2O_2$. The $SO_2$ component is added if the exit waste gas contains little or no $SO_2$.

In an embodiment of the invention, apart from Hhd $2O_2$, Caro's acid can also be applied.

The waste gas can moreover be led through a fixed bed or fluidized bed of a solid while an aqueous mixture of $H_2O_2$ and $H_2SO_4$ is sprayed onto the solid.

In an embodiment of the invention, before the solid is introduced into the waste gas stream, it can be impregnated with $H_2SO_4$ and $H_2O_2$ applied.

In a further embodiment of the invention, before the solid is introduced into the waste gas stream, it can be impregnated with $H_2O_2$ and $H_2SO_4$ applied.

In a further embodiment of the invention, before the solid is introduced into the waste gas stream, it can be impregnated with Caro's acid or with an aqueous solution of its salt. Likewise, before the solid is introduced into the waste gas stream, it can be sprayed with Caro's acid or with an aqueous solution of its salt.

As the solid, the following can be used as finely-divided, granulated or tabletted substances or as substances formed to any shaped articles, including honeycomb bodies, or applied to honeycomb-shaped supports, alone or in a mixture:

silica gels, precipitated silicic acids, pyrogenic silica, optionally in hydrophobed form;

wide- or medium-pore natural or synthetic zeolites;

phyllosilicates;

aluminum oxide;

diatomaceous earth;

titanium dioxide;

natural or synthetic layer silicates.

The following solids have been thoroughly checked experimentally:

Aerosil 200 (pyrogenic amorphous silicic acid), tablets 6×5.5 mm (development product from the commercial product Aerosil 200 of the Degussa company, Frankfurt);

Wide-pore 12-ring zeolite, dealuminized y-zeolite (pore width 7.4 Å, modulus 200 ($Si/Al=100$)).

The solids according to the invention have the advantage that they are not combustible. They are temperature-stable up to 900° C. They are regenerable, so that remaining dioxins can be completely destroyed, for example by means of Fenton's reagent ($H_2O_2+Fe(II)$ or $Fe(III)$ salts) or by means of another known chemical reaction or thermally. In the process according to the invention, the preponderant part of the dioxins is destroyed directly on the solid.

The amount of $H_2O_2$ or of Caro's acid depends on the quantity of dioxin that has to be destroyed. The destruction of dioxin should, to the extent possible, be quantitative.

The $H_2O_2$ is added as an aqueous solution with an $H_2O_2$ content of 30 to 90 wt %, preferably 50%.

If the waste gas contains no $SO_2$, $SO_2$ can be added to the waste gas in an amount of 0.01 to more than 10,000 ppm.

The fixed bed can be impregnated with $H_2SO_4$ in an amount up to the saturation of the solid.

The fixed bed can be impregnated with $H_2O_2$ at a concentration of 1 to 90 wt % and in an amount up to the saturation of the solid.

An aqueous solution of $H_2SO_4$ can be introduced into the waste gas stream in a concentration of 10 to 98 wt % and in an amount of 0.01 to 10 $g/m^3 \times s^{-1}$.

It appears to be essential according to the invention that, apart from $H_2SO_4$, $H_2O_2$ also is present in the reaction zone. The Caro's acid formed as an intermediate appears to be the effective agent. The waste gas temperature should optionally be above the dewpoint that results from the water content of the waste gas. This is necessary in order to prevent the condensation of water on the fixed bed, which would lead to undesired dilution of the acid.

The process according to the invention has the following advantages:

First, an incombustible catalyst or solid is used, second, the dioxins or the chlorinated organic compounds are not only adsorbed on the solid but also destroyed there substantially quantitatively.

DETAILED DESCRIPTION OF PREFERRED EMBODIMENT

Examples

In a continuous test for nitrogen oxide reduction of a waste gas from a refuse incineration plant, parallel dioxin measurements were carried out:

The object was to investigate the behavior of the poly-chlorinated dibenzodioxins and -furans under strongly oxidizing conditions (destruction or adsorption on the catalyst). To this end the experimental plant was operated continuously in 24-hour shift operation over a period of 10 days. After 7 days continuous operation, the actual dioxin measurement started. To this end, gas samples were taken on three successive days, in each case before contact with the catalyst and after contact with the catalyst, over a period of 6 hours. At the end of the test, samples of the catalyst also were taken.

$SiO_2$ tablets that had been formed from the pyrogenically produced silicon dioxide Aerosil 200 were used as the solid.

In the course of this the following conditions were maintained:

| | |
|---|---|
| Reactor diameter | 300 mm |
| Bed height of the fixed bed | 400 mm |
| Material: Aerosil 200 tablets | 6 × 5 mm |
| Volume of the fixed bed | 28–30 liters |
| Bulk density ca. | 0.5 kg/liter |
| Temperature at the reactor inlet | 69–70° C. |
| Temperature at the reactor outlet | 69° C. |
| Dew point of the gas ca. | 60° C. |
| Pressure drop ca. | 110 mm water column |
| Linear velocity in the reactor | 0.6–0.7 meters/second |
| Gas throughput ca. | 160 m³/h ≈ ca. 130 Nm³/h moist gas ≈ ca. 104 Nm³/h dry gas |
| $H_2O_2$ (50%) dosing rate | 1 ml/min |
| Average $SO_2$ content in crude gas | ca. 5–15 mg/Nm3 |
| Test duration | 10 days |
| Mass balance | |

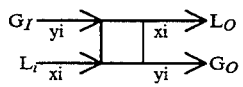

L = liquid streams
G = gas streams
I = inlet
O = outlet
xi = concentration of component i in the liquid phase
yi = concentration of component i in the gas phase The sampling points can be taken from FIG. 1

The results of the measurements are shown in Tables 1 to 9. Table 10 shows results of measurements obtained by a process according to the prior art.

The abbreviations used in the examples have the following meanings:
1. 1, 2, 3, 6, 7, 8-Hexa CDF=1, 2, 3, 6, 7, 8-hexachlorodibenzofuran
2. BGA=German Federal Office of Public Health
3. ng=nanogram
4. TE=toxicity equivalent
5. PCDF=perchlorinated dibenzofurans
6. PCDD=perchlorinated dibenzodioxins
7. Tetra CDF=tetrachlorodibenzofuran
8. Penta CDF=pentachlorodibenzofuran
9. Hexa CDF=hexachlorodibenzofuran
10. Hepta CDF=heptachlorodibenzofuran
11. Octa CDF=octachlorodibenzofuran
12. Tetra CDD=tetrachlorodibenzodioxin
13. Penta CDD=pentachlorodibenzodioxin
14. Hexa CDD=hexachlorodibenzodioxin
15. Hepta CDD=heptachlorodibenzodioxin
16. Octa CDD=octachlorodibenzodioxin
17. Gef. Stoff. V.=Decree on Hazardous Substances
18. CC MS=Committee on Challenges of Modern Society
19. North Atlantic Treaty Organization
20. NWG=limit of detection
21. Congeners are molecules of the same basic structure of different degrees of substitution
22. SP-2331=special column for chromatography (polar column based on siloxane)
23. 1,0134 Pa=pressure datum in Pascal
24. BGA/UBA=German Federal Office of Public Health/Federal Office of the Environment Conditions:

Reactor charge 30 liters Aerosil 200 tablets (density 0.5 kg/l)=15 kg

The reactor is operated for 240 hours with 130 Nm³/h waste gas with a moisture content of ca. 20% from the refuse incineration plant.

$L_I$=50% $H_2O$+50% water, containing no dioxin $L_O$=condensate, low volume flow rate, containing no dioxin Calculation:

1. Total quantity of gas (moist gas) 130 Nm³/h×24 h/d×10 d=31,200 Nm³
2. Total quantity of gas (dry gas) 31,200×0.8=ca. 25,000 Nm³

Dioxin content of the fresh catalyst=0 $Dioxin_{in}$−$Dioxin_{out}$=$Dioxin_{reacted}$+$Dioxin_{accumulated}$ Exemplary calculation for 1, 2, 3, 6, 7, 8-hexa CDF (TE=0.1)

| | |
|---|---|
| Average inlet concentration, absolute | = 3.85 ng/Nm³ |
| Average outlet concentration | = 0.07 ng/Nm³ |
| Max. concn. on the catalyst (top layer) | = 1.1870 ng/g |
| Average concn. on the catalyst (mixed sample) | = 0.099 ng/g |
| $Dioxin_{in}$ = 3.85 × 25,000 = 96,250 ng | = 100% |
| $Dioxin_{out}$ = 0.07 × 25,000 = 1,750 ng | = 1.8% |
| $Dioxin_{acc.}$ (max.) = 1.1870 × 1000 g/kg × 15 | = 17,805 |
| | = 18.5% |
| $Dioxin_{acc.}$ (average) = 0.099 × 1000 × 15 | = 1,485 |
| | = 1.54% |

From this, there follows a reaction of 80–97% for this component. The calculation was carried out for all components: see Table 09.

Results

The crude gas stream has an average dioxin contamination of 4.19 ng TE (BGA)/Nm³ (3.9–4.61).

The average clean gas concentration is 0.014 ng TE(BGA)/Nm³ (0.010–0.017).

The average proportion of dioxin removed in the system is accordingly 99.67% (see also Table 08).

On the catalyst, there is on average 0.050 ng TE/g catalyst. Peak values in the top catalyst layer are about 0.635 ng TE/g catalyst.

Via the gas stream, ca. 104,750 ng TE are fed in. The amount discharged is ca. 350 ng TE. On the catalyst, ca. 750 ng TE are found. It follows from this that on average 99% of the dioxins are destroyed on the catalyst and ca. 0.7% accumulate over a period of 10 days.

In the period of the test, as well as in the continuous operation of the plant after the test, it is observed that sulphuric acid accumulates on the catalyst. This sulphuric acid comes from the reaction of the residual $SO_2$ of the flue gas with hydrogen peroxide. It is present on the catalyst in highly concentrated form, since its vapor pressure is distinctly lower than that of water. It is assumed that the dioxins are not oxidized by the hydrogen peroxide but by Caro's acids formed as an intermediate from $H_2O_2$ and $H_2SO_4$. Mass balances are drawn up for all of the individual components. It is apparent that, by oxidation, the low-chlorinated dioxins and furans up to $C_{16}$ are destroyed preferentially. The less poisonous highly chlorinated dioxins and furans up to $C_{18}$ are somewhat more slowly oxidized.

TABLE 01

Description of the Solid Sampling Conditions and of the Sampling Points Concerned

| Matrix or point of removal | Alloted sample number | Description |
|---|---|---|
| SiO₂ (reference sample) | P 1.1 | The SiO₂ tablets are taken by the operator from a stock bin. |
| SiO₂ (top layer) | P 2.1 | After the end of three waste gas sampling series, the catalyst is opened at the top, and the top layer of the SiO₂ fixed bed is removed by the operator. |
| SiO₂ (mixed sample) | P 2.2 | After completion of the above sampling and after removing the top layer, the whole catalyst charge is discharged into a vessel by the operator and thoroughly mixed. A sample is taken from the mixing vessel. |

TABLE 02

Description of Measuring and Sampling Points (Technical Data) for Waste Gas Sampling

| Position of measuring point in flue gas path | Alloted sample number | Duct cross-section[a] (m²) | Edge lengths (m) | Diameter (m) | Length of inflow section (m) | Length of outflow section (m) | Does the sampling point meet the requirements of VDI Guideline 2066, page 1, regarding the measuring section? |
|---|---|---|---|---|---|---|---|
| Crude gas before catalyst | P 3.1-3 | 0.03 (round) | | 0.1 | 0.1 | 0.1 | the sampling was no not isokinetic; the waste gas samples were taken via a flanged glass tube. |
| Clean gas after catalyst | P 4.1-3 | 0.03 (round) | | 0.1 | 0.2 | 0.2 | the sampling was no not isokinetic; the waste gas samples were taken via a flanged glass tube. |

[a] round, square or rectangular

TABLE 03

Survey of Samples and Analyses

| Matrix | Sampling date | Sampling period | Sample no. | Sample volume (m³)[b] | O₂ normalizing factor (% O₂ → 11% O₂) | PCDF/D |
|---|---|---|---|---|---|---|
| SiO₂ (reference sample) | 19.09.91 | a | P 1 | | | x |
| SiO₂ (top layer) | 19.09.91 | a | P 2.1 | | | x |
| SiO₂ (mixed sample) | 19.09.91 | a | P 2.2 | | | x |
| Crude gas before catalyst | 17.09.91 | 0900–1500 | P 3.1 | 10.136 | 0.98 | x |
| Clean gas after catalyst | 17.09.91 | 0900–1500 | P 4.1 | 10.579 | 0.98 | x |
| Crude gas before catalyst | 18.09.91 | 0830–1430 | P 3.2 | 10.043 | 1.00 | x |
| Clean gas after catalyst | 18.09.91 | 0830–1430 | P 4.2 | 10.804 | 1.00 | x |
| Crude gas before catalyst | 19.09.91 | 0730–1330 | P 3.3 | 10.542 | 0.89 | x |
| Clean gas after catalyst | 19.09.91 | 0730–1330 | P 4.3 | 10.296 | 0.89 | x |

[a] sampling by operator
[b] referred to 0° C., 1,013 hPa, dry

TABLE 04

PCDF/D Concentration in the SiO$_2$ (Reference Sample: P 1.3, Top Layer: P 2.1, Mixed Sample: P 2.2)

| | Sample number | | |
|---|---|---|---|
| PCDF/PCDD | P 1.3 ng/g | P 2.1 ng/g | 2.2 ng/g |
| Total TetraCDF | b | 3.52 | 0.22 |
| Total PentaCDF | b | 5.63 | 0.41 |
| Total HexaCDF | b | 8.16 | 0.64 |
| Total HeptaCDF | 0.004 | 6.13 | 0.51 |
| OctaCDF | <0.004 | 1.54 | <0.11 |
| Total Tetra- to OctaCDF | 0.004 | 24.98 | 1.78 |
| 2378-TetraCDF* | <0.0009 | 0.148 | 0.010 |
| 12378-/12348-PentaCDF[a] | <0.0014 | 0.483 | 0.035 |
| 23478-PentaCDF* | <0.0014 | 0.372 | 0.033 |
| 123478-/123479-HexaCDF[a] | <0.0015 | 0.880 | 0.069 |
| 123678-HexaCDF* | <0.0015 | 1.187 | 0.099 |
| 123789-HexaCDF | <0.0015 | 0.070 | 0.004 |
| 234678-HexaCDF | <0.0015 | 0.816 | 0.084 |
| 1234678-HeptaCDF | 0.0038 | 5.202 | 0.450 |
| 1234789-HeptaCDF | <0.0009 | 0.123 | 0.010 |
| Total TetraCDD | b | 0.14 | b |
| Total PentaCDD | b | 0.49 | 0.03 |
| Total HexaCDD | b | 0.70 | 0.05 |
| Total HeptaCDD | b | 1.09 | 0.12 |
| OctaCDD | 0.008 | 1.45 | 0.18 |
| Total Tetra- to OctaCDD | 0.008 | 3.87 | 0.38 |
| 2378-TetraCDD* | <0.0008 | 0.011 | <0.001 |
| 12378-PentaCDD* | <0.0011 | 0.062 | 0.006 |
| 123478-HexaCDD* | <0.0023 | 0.041 | <0.004 |
| 123678-HexaCDD* | <0.0023 | 0.069 | <0.004 |
| 123789-HexaCDD* | <0.0023 | 0.043 | <0.004 |
| 1234678-HeptaCDD | <0.0035 | 0.506 | 0.062 |
| Total Tetra- to OctaCDF/C | 0.012 | 23.85 | 2.16 |
| Total PCDF/D according to GefStoffV* | b | 1.933 | 0.148 |
| TE (BGA 1984) | <0.0001 | 0.635 | 0.050 |
| TE (NATO/CCMS 1988) | <0.0001 | 0.639 | 0.053 |
| TE (NATO/CCMS incl. NWG) | 0.0036 | 0.639 | 0.056 | if not specifically mentioned, undetected congeners or homologue groups are not taken into account in totals and toxicity equivalents (TE).
[a]Congeners not separable chromatographically on SP-2331.
[b]Undetectable.

TABLE 05

2378-TetraCDD Toxicity Equivalent Factors (TEF) According to a Proposal of the BGA, Berlin, and NATO/CCMS

| PCDF/D | BGA 1984 | NATO/CCMS 1988 |
|---|---|---|
| 2378-TetraCDD | 1.0 | 1.0 |
| 12378-PentaCDD | 0.1 | 0.5 |
| 123478-HexaCDD | 0.1 | 0.1 |
| 123678-HexaCDD | 0.1 | 0.1 |
| 123789-HexaCDD | 0.1 | 0.1 |
| 1234678-HeptaCDD | 0.01 | 0.01 |
| Octa-CDD | 0.001 | 0.001 |
| 2378-TetraCDF | 0.1 | 0.1 |
| 12378-PentaCDF | 0.1 | 0.05 |
| 23478-PentaCDF | 0.1 | 0.5 |
| 123478-HexaCDF | 0.1 | 0.1 |
| 123678-HexaCDF | 0.1 | 0.1 |
| 123789-HexaCDF | 0.1 | 0.1 |
| 234678-HexaCDF | 0.1 | 0.1 |
| 1234678-HeptaCDF | 0.01 | 0.01 |
| 1234789-HeptaCDF | 0.01 | 0.01 |
| OctaCDF | 0.001 | 0.001 |
| Σ TetraCDD | 0.01 | 0 |
| Σ PentaCDD | 0.01 | 0 |
| Σ HexaCDD | 0.01 | 0 |
| Σ HeptaCDD | 0.001 | 0 |
| Σ TetraCDF | 0.01 | 0 |
| Σ PentaCDF | 0.01 | 0 |
| Σ HexaCDDF | 0.01 | 0 |
| Σ HeptaCDF | 0.001 | 0 |

The TE value of a sample is calculated by multiplying the concentration concerned by the corresponding TEF and adding the products. It should be taken into account that the calculated total values do not contain the 2378-Cl-substituted congeners of the homologue group concerned.

TABLE 06

PCDF/D Concentration in the Crude Gas before the Catalyst (P 3.1-3)
Reference state: 0° C., 1,013 hPa, dry, normalized to 11% O$_2$

| | Sample number | | |
|---|---|---|---|
| PCDF/PCDD | P 3.1 ng/m$^3$ | P 3.2 ng/m$^3$ | P 3.3 ng/m$^3$ |
| Total TetraCDF | 58.3 | 42.0 | 50.3 |
| Total PentaCDF | 56.1 | 47.1 | 49.7 |
| Total HexaCDF | 27.5 | 27.0 | 37.0 |
| Total HeptaCDF | 15.9 | 16.1 | 17.4 |
| OctaCDF | 3.6 | 4.9 | <1.8 |
| Total Tetra- to OctaCDF | 161.4 | 137.1 | 154.4 |
| 2378-TetraCDF | 1.61 | 1.55 | 1.78 |
| 12378-/12348-PentaCDF[a] | 5.13 | 4.28 | 4.30 |
| 23478-PentaCDF | 2.21 | 2.38 | 2.84 |
| 123478-/123479-HexaCDF[a] | 3.21 | 3.22 | 4.45 |
| 123678-HexaCDF | 3.40 | 3.39 | 4.75 |
| 123789-HexaCDF | 0.23 | 0.29 | 0.30 |
| 234678-HexaCDF | 1.94 | 3.03 | 3.42 |
| 1234678-HeptaCDF | 12.57 | 12.07 | 14.13 |
| 1234789-HeptaCDF | 0.40 | 0.59 | 0.36 |
| Total TetraCDD | 3.8 | 4.9 | 5.8 |
| Total PentaCDD | 8.8 | 10.6 | 12.1 |
| Total HexaCDD | 7.2 | 9.3 | 9.5 |
| Total HeptaCDD | 9.2 | 8.8 | 10.0 |
| OctaCDD | 10.8 | 11.9 | 10.6 |
| Total Tetra- to OctaCDD | 39.8 | 45.5 | 48.0 |
| 2378-TetraCDD | 0.39 | 0.37 | 0.44 |
| 12378-PentaCDD | 1.19 | 1.21 | 1.61 |
| 123478-HexaCDD | 0.40 | 0.45 | 0.53 |
| 123678-HexaCDD | 0.67 | 0.84 | 0.87 |
| 123789-HexaCDD | 0.59 | 0.77 | 0.85 |
| 1234678-HeptaCDD | 4.45 | 4.49 | 4.89 |
| Total Tetra- to OctaCDF/D | 201.2 | 182.6 | 202.4 |
| TE (BGA 1984) | 4.05 | 3.90 | 4.61 |
| TE (NATO/CCMS 1988) | 3.74 | 3.92 | 4.78 |
| TE (NATO/CCMS incl. NWG) | 3.74 | 3.92 | 4.78 |

If not specifically mentioned, undetected congeners or homologue groups are not taken into account in totals and toxicity equivalents (TE).
[a]Congeners not separable chromatographically on SP-2331.

TABLE 07

PCDF/D Concentration in the Clean Gas after the Catalyst (P 4.1-3)
Reference state: 0° C., 1,013 hPa, dry, normalized to 11% O$_2$

| | Sample number | | |
|---|---|---|---|
| PCDF/PCDD | P 4.1 ng/m$^3$ | P 4.2 ng/m$^3$ | P 4.3 ng/m$^3$ |
| Total TetraCDF | b | 0.07 | 0.03 |
| Total PentaCDF | 0.05 | 0.07 | 0.03 |
| Total HexaCDF | 0.15 | 0.17 | 0.10 |
| Total HeptaCDF | 0.20 | 0.26 | 0.16 |
| OctaCDF | 0.32 | 0.36 | 0.09 |
| Total Tetra- to OctaCDF | 0.72 | 0.93 | 0.41 |
| 2378-TetraCDF | <0.004 | 0.004 | 0.003 |
| 12378-/12348-PentaCDF[a] | 0.008 | 0.008 | 0.005 |
| 23478-PentaCDF | 0.008 | 0.007 | 0.004 |
| 123478-/123479-HexaCDF[a] | 0.028 | 0.021 | 0.014 |
| 123678-HexaCDF | 0.017 | 0.019 | 0.012 |
| 123789-HexaCDF | <0.003 | <0.007 | <0.002 |
| 234678-HexaCDF | 0.037 | 0.042 | 0.027 |
| 1234678-HeptaCDF | 0.146 | 0.184 | 0.114 |
| 1234789-HeptaCDF | 0.007 | 0.016 | 0.009 |
| Total TetraCDD | b | b | b |
| Total PentaCDD | b | b | b |
| Total HexaCDD | b | b | b |
| Total HeptaCDD | 0.15 | 0.19 | 0.12 |
| OctaCDD | 0.68 | 0.84 | 0.52 |

TABLE 07-continued

PCDF/D Concentration in the Clean Gas after the Catalyst (P 4.1-3)
Reference state: 0° C., 1,013 hPa, dry, normalized to 11% $O_2$

| PCDF/PCDD | P 4.1 ng/m³ | P 4.2 ng/m³ | P 4.3 ng/m³ |
|---|---|---|---|
| Total Tetra- to OctaCDD | 0.83 | 1.03 | 0.64 |
| 2378-TetraCDD | <0.002 | <0.003 | <0.003 |
| 12378-PentaCDD | <0.004 | <0.005 | <0.004 |
| 123478-HexaCDD | <0.012 | <0.005 | <0.013 |
| 123678-HexaCDD | <0.012 | <0.005 | <0.013 |
| 123789-HexaCDD | <0.012 | <0.005 | <0.013 |
| 1234678-HeptaCDD | 0.088 | 0.108 | 0.073 |
| Total Tetra- to OctaCDF/D | 1.55 | 1.96 | 1.05 |
| TE (BGA 1984) | 0.014 | 0.017 | 0.010 |
| TE (NATO/CCMS 1988) | 0.016 | 0.017 | 0.010 |
| TE (NATO/CCMS incl. NWG) | 0.024 | 0.024 | 0.020 |

If not specifically mentioned, undetected congeners or homologue groups are not taken into account in totals and toxicity equivalents (TE).
[a] Congeners not separable chromatographically on SP-2331.
[b] Undetectable

TABLE 08

Proportions of PCDF/D Decomposed After the Catalyst (P 4.1-3)

| Proportion removed | P 4.1 % | P 4.2 % | P 4.3 % |
|---|---|---|---|
| Total TetraCDF | b | 99.83 | 99.94 |
| Total PentaCDF | 99.91 | 99.85 | 99.94 |
| Total HexaCDF | 99.46 | 99.37 | 99.73 |
| Total HeptaCDF | 98.72 | 98.39 | 99.08 |
| OctaCDF | 91.11 | 92.65 | <95.00 |
| Total Tetra- to OctaCDF | 99.56 | 99.32 | 99.73 |
| 2378-TetraCDF | >99.75 | 99.74 | 99.83 |
| 12378-/12348-PentaCDF[a] | 99.84 | 99.81 | 99.88 |
| 23478-PentaCDF | 99.64 | 99.71 | 99.85 |
| 123478-/123479-HexaCDF[a] | 99.13 | 99.35 | 99.69 |
| 123678-HexaCDF | 99.50 | 99.44 | 99.75 |
| 123789-HexaCDF | >98.70 | >97.59 | >99.33 |
| 234678-HexaCDF | 98.09 | 98.61 | 99.21 |
| 1234678-HeptaCDF | 98.84 | 98.48 | 99.19 |
| 1234789-HeptaCDF | 98.25 | 97.29 | 97.50 |
| Total TetraCDD | b | b | b |
| Total PentaCDD | b | b | b |
| Total HexaCDD | b | b | b |
| Total HeptaCDD | 98.37 | 97.84 | 98.80 |
| OctaCDD | 93.70 | 92.94 | 95.09 |
| Total Tetra- to OctaCDD | 97.91 | 97.74 | 98.67 |
| 2378-TetraCDD | >99.49 | >99.19 | >99.32 |
| 12378-PentaCDD | >99.66 | >99.59 | >99.75 |
| 123478-HexaCDD | >97.00 | >98.89 | >97.55 |
| 123678-HexaCDD | >98.21 | >99.40 | >98.51 |
| 123789-HexaCDD | >97.97 | >99.35 | >98.47 |
| 1234678-HeptaCDD | 98.02 | 97.59 | 91.80 |
| Total Tetra- to OctaCDF | 99.23 | 98.93 | 99.48 |
| TE according to ... | | | |
| BGA/UBA 1984 | 99.65 | 99.93 | 99.78 |
| NATO/CCMS 1988 | 99.57 | 99.95 | 99.79 |
| TE (NATO/CCMS incl. NWG) | 99.36 | 99.89 | 99.58 |

Undetected congeners or homologue groups are not taken into account in totals and toxicity equivalents (TE).
[a] Congeners not separable chromatographically on SP-2331.
[b] Not calculable

TABLE 09

Percentage Contents of the Individual Components and Conversions

| Components | % inlet | % outlet | Top layer % max on catalyst | In the middle average % on catalyst | % conversion average |
|---|---|---|---|---|---|
| Sum TetraCDF | 100.00 | 0.07 | 4.21 | 0.26 | 99.67 |
| Sum PentaCDF | 100.00 | 0.10 | 6.63 | 0.48 | 99.42 |
| Sum HexaCDF | 100.00 | 0.46 | 16.05 | 1.26 | 98.28 |
| Sum HeptaCDF | 100.00 | 1.26 | 22.34 | 1.86 | 96.89 |
| OctaCDF | 100.00 | 9.06 | 32.61 | 0.00 | 90.94 |
| Sum Tetra- to OctaCDF | 100.00 | 0.45 | 9.93 | 0.71 | 98.84 |
| 2378-TetraCDF | 100.00 | 0.14 | 5.39 | 0.36 | 99.49 |
| 12378-/12348-PentaCDF | 100.00 | 0.15 | 6.34 | 0.46 | 99.39 |
| 23478-PentaCDF | 100.00 | 0.26 | 9.01 | 0.80 | 98.94 |
| 123478-/123479-HexaCDF | 100.00 | 0.58 | 14.56 | 1.14 | 98.28 |
| 123678-HexaCDF | 100.00 | 1.74 | 18.51 | 1.54 | 96.71 |
| 123789-HexaCDF | 100.00 | 0.00 | 15.37 | 0.88 | 99.12 |
| 234678-HexaCDF | 100.00 | 1.26 | 17.51 | 1.80 | 96.93 |
| 1234678-HeptaCDF | 100.00 | 1.15 | 24.15 | 2.09 | 96.77 |
| 1234789-HeptaCDF | 100.00 | 2.37 | 16.40 | 1.33 | 96.30 |
| Sum TetraCDD | 100.00 | 0.00 | 1.74 | 0.00 | 100.00 |
| Sum PentaCDD | 100.00 | 0.00 | 2.80 | 0.17 | 99.83 |
| Sum HexaCDD | 100.00 | 0.00 | 4.85 | 0.35 | 99.65 |
| Sum HeptaCDD | 100.00 | 1.64 | 7.01 | 0.77 | 97.59 |
| OctaCDD | 100.00 | 6.13 | 7.84 | 0.97 | 92.90 |
| Sum Tetra- to OctaCDD | 100.00 | 1.88 | 5.23 | 0.51 | 97.61 |
| 2378-TetraCDD | 100.00 | 0.00 | 0.15 | 0.00 | 100.00 |
| 12378-PentaCDD | 100.00 | 0.00 | 2.78 | 0.27 | 99.73 |
| 123478-HexaCDD | 100.00 | 0.00 | 5.35 | 0.00 | 100.00 |
| 123678-HexaCDD | 100.00 | 0.00 | 5.22 | 0.00 | 100.00 |
| 123789-HexaCDD | 100.00 | 0.00 | 3.50 | 0.00 | 100.00 |
| 1234678-HeptaCDD | 100.00 | 1.95 | 6.59 | 0.81 | 97.25 |
| Sum Tetra- to OctaCDF/D | 100.00 | 0.78 | 8.86 | 0.66 | 98.56 |

It has been established that at a crude gas concentration of ca. 4.2 ng TE/m³ ca. 99.67% of the PCDD/F's are removed from the gas. Ca. 0.7% accumulates on the catalyst. On average, 98.95 is destroyed oxidatively. The individual component analyses showed that the lower-chlorinated (and with that, more poisonous) compounds up to $C_{16}$ are oxidized preferentially. The so-called Seveso dioxin (2,3,7,8-TCDD) is completely destroyed. It is assumed that the residual SC content of the flue gas plays a decisive role for the oxidation reaction. In the course of this, $SO_2$ is very probably converted with $H_2O_2$ via the $H_2SO_4$ stage to $H_2SO_5$ (Caro's acid). It has further been established that sulphuric acid concentrates on the catalyst. This sulphuric acid can form Caro's acid with the hydrogen peroxide. The oxidizing action of Caro's acid is considerably greater than that of hydrogen peroxide alone, and is supposed to be sufficient to destroy dioxins.

The following methods were used in making the measurements:

$SO_2$ UV Adsorption, Rosemount company, Binos series
$NO_x$ Chemiluminescence, Rosemount company, Type 950 or 951
Dioxins For the analysis of the PCDF and PCDD before the reactor, the HRGC/LRMS system (MSD) was used; and for the analysis after the reactor the HRGC/HRMS system. The sample was taken with the XAD-z cartridges with C-1234 TetraCDD standard.

TABLE 10

PCDD/CDF Waste Gas Cleaning in Refuse Incineration Plants

| Incineration Plant | PCDD/PCDF Waste Gas Cleaning | PCDD/PCDF Concentration in ng TE/$m^3$ | | Waste Gas Amount, $m^3/h$ |
|---|---|---|---|---|
| | | Crude Gas | Clean Gas | |
| *Pilot Plants* | | | | |
| MVA Düsseldorf | Activated coke adsorber | 2.4–2.7[1] | 0.022–0.025 | 2,000 |
| MVA Stapelfeld | Activated coke adsorber | 1.6–5.8[1] | 0.026–0.079 | 100 |
| MVA Flözersteig | Activated coke adsorber | 0.6–1.0[1] | 0.03–0.05 | 200 |
| SMVA Simmering | Activated coke adsorber | 1.0–9.3[1] | 0.05 | 200 |
| *Operating Plants* | | | | |
| SMVA Schöneiche | Dry additive process with addition of activated coke | 0.34–1.74[2] | 0.011–0.022 | 17,000 |
| MVA Neufahrn | Dry additive process[3] | not measured | 0.09 | 18,000 |
| MVA Düsseldorf | Hearth-type furnace coke/activated coke adsorber | 1–5[5] | <0.1[4] | 3 × 160,000 |
| RZR Herten | Hearth-type furnace coke/activated coke adsorber | 1–5[5] | <0.1[4] | 70,000 |

[1] measured after the removal stages for dust, halogens and sulphur dioxide.
[2] after steam generator
[3] without special steps for cleaning PCDD/PCDF from waste gas
[4] design value
[5] after electrofilter
MVA = refuse incineration plant
SMVA = special waste incineration plant
Source: Statutory regulations and measures for limiting dioxin and furan pollution, Prof. Dr. Ing, Michael Lange, VBA Berlin Lecture at VDA Meeting, 17-18/September/1991, Munich

What is claimed is:

1. A process for removing halogenated organic compounds selected from the group consisting of polychlorinated dibenzodioxins and polychlorinated dibenzofurans from waste gases containing said halogenated organic compounds which comprises contacting said waste gases with Caro's acid or an aqueous solution of its salt.

2. A process as set forth in claim 1 in which the waste gases are led through a fixed bed or fluidized bed of a solid where it is contacted with Caro's acid.

3. A process according to claim 1 or claim 2 in which the waste gas is supplemented with $SO_2$ and contacted with $H_2O_2$, whereby Caro's acid is produced in situ.

4. A process according to claim 1 in which the waste gas is led through a fixed bed or fluidized bed of a solid and at the same time a mixture of $H_2O_2$ and $H_2SO_4$ is sprayed onto the solid.

5. A process according to claim 2 or claim 4 in which, before the solid is introduced into the waste gas stream, it is impregnated with $H_2SO_4$ and $H_2O_2$ is applied.

6. A process according to claim 2 or claim 4 in which, before the solid is introduced into the waste gas stream, it is impregnated with $H_2O_2$ and $H_2SO_4$ is applied.

7. A process according to claim 2 in which, before the solid is introduced into the waste gas stream, it is impregnated with Caro's acid or with an aqueous solution of its salt.

8. A process according to claim 2 in which, before the solid is introduced into the waste gas stream, it is sprayed with Caro's acid or with an aqueous solution of its salt.

9. A process as set forth in claim 1 in which said waste gas also contains $NO_x$.

* * * * *